April 24, 1945. N. TANAKA 2,374,566
REFLECTION MEANS FOR PRESENTING PICTURES
Filed July 10, 1943
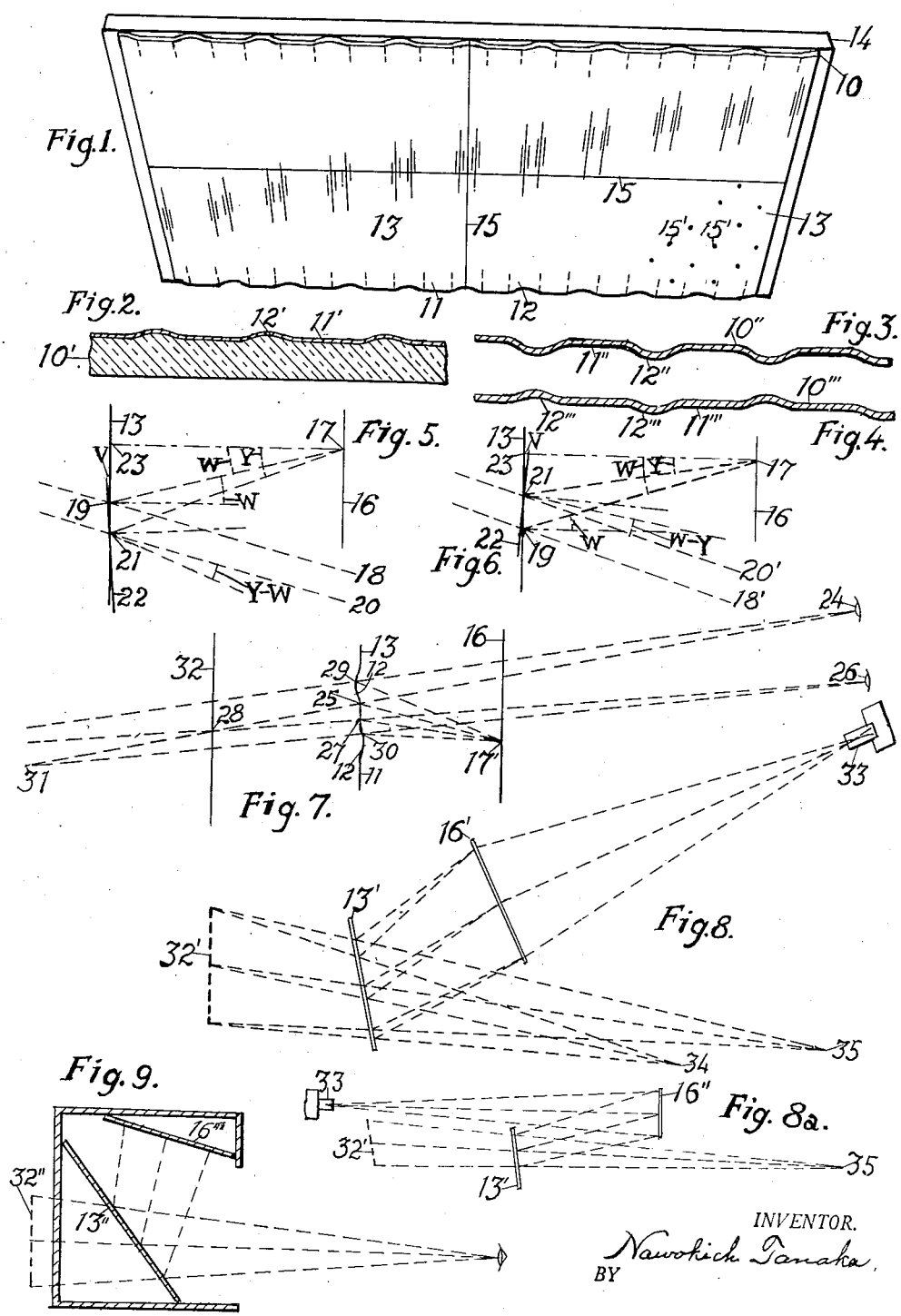
INVENTOR.
Nawokich Tanaka
BY Patented Apr. 24, 1945

2,374,566

UNITED STATES PATENT OFFICE 2,374,566

REFLECTION MEANS FOR PRESENTING PICTURES

Nawokich Tanaka, New York, N. Y.

Application July 10, 1943, Serial No. 494,186

9 Claims. (Cl. 88—28.90)

This invention relates to reflection means for presenting pictures in apparent three dimensions, whereby photographic and certain other perspective pictures, projected or printed on picture carriers, may be shown with relief effect to naked eyes.

The invention resides on the following discoveries: When rays of light from each small part of a picture are reflected by a specular surface toward two teamed eyes in such manner that the intersections of visual lines therefrom will occur without conscious effort on the part of the viewer, at two or more points on planes at different distances from the eyes, said picture as a whole will appear as if it has some depth. However, for securing satisfactory results with prominent manifestation of the third dimension the specular reflective surface should comprise plane and curved strip areas, the widths thereof limited in relation to the interpupillary distance.

The generic object of this invention is to provide means by which two dimensional visible representations of three dimensional objects can be presented with the apparent third dimension.

The main object is to provide means whereby projected still or motion pictures may be shown in apparent three dimensions to naked eyes, employing customary picture films, without sacrificing much illumination.

Another object is to provide means by which photographs, prints thereof, in full or half tone, or certain paintings may be shown or displayed with a three dimensional effect.

A further objective is the employment of a reflector having its specular surface striped with alternate plane and curved areas, the widths thereof being of dimensions dependent upon and limited by the interpupillary distance, and the curved areas having predetermined curvatures calculated for the best performance.

With the above and other objects in view, this invention comprises a certain detail of construction and arrangement of parts as will be hereinafter more fully described, illustrated and claimed, the reference being taken in the accompanying drawing which forms a part of this specification.

In the drawing,

Fig. 1 illustrates a perspective view of a reflector, embodying the present invention;

Figs. 2 to 4 show various modifications of my reflectors in fragmental sections;

Figs. 5 and 6 are diagrams for trigonometrically determining suitable contours of the reflective surfaces and dimensions of parts of the reflectors;

Fig. 7 explains the underlying principle of optical actions leading to the perception of depth in a picture by virtue of my reflector; and Figs. 8, 8a and 9 depict reflection systems or devices, embodying the invention.

Like numerals designate similar or corresponding parts throughout the views.

Referring to Fig. 1, the body 10 of a reflector is a metallic plate machined or moulded to provide series of plane strip areas 11 and curved strip areas 12 on a surface thereof devoid of angular kinks or sharp bends. Although the depressions at 12 are shown quite prominently for the sake of illustration, it will be later made apparent that the depths of the depressions are exaggerated in comparison with the widths of the strip areas. The surface 13 of the reflector plate 10 is coated or plated with a suitable material, such as chromium or the like, and smoothly polished to a mirrory reflective surface. The reflector is suitably mounted on a supporting member 14 to be kept flat and steady to avoid undue distortion of reflected images.

The reflector may consist of a number of units or segments, each individually constructed as described to provide a large reflective surface for large pictures. Since any irregularity of the reflective surface is a cause of distortion or misplacement of images, it goes without saying that these segments should be arranged on a single plane to form a practically continuous flat reflective surface on a support common to all. The view in Fig. 1 may be taken as one unit or the composition of four segments as indicated by lines 15.

When it is desired to furnish sound passages through the body of such a reflector, as it may be required in incorporating it in a sound cinematograph system, such perforations 15' similar to those seen on some of the existing picture screens may be provided with no more drawbacks as to the effectiveness of operation than a perforated picture screen has. However, as an alternative, sound passages may be provided by arranging the segments with narrow slits left therebetween as at 15.

The body of a reflector may be a glass plate 10' as shown in Fig. 2. Its back surface is moulded to form plane strip areas 11' and curved strip areas 12' and silvered as a mirror.

The specular surface of a modification shown in Fig. 3 comprises a series of curved strip areas 12'' jutting out very slightly of plane areas 11''.

In Fig. 4, curved areas have both boss and depression curvatures. As in the case of Fig. 1, the depressions on the specular surfaces in these views are depicted with exaggerated depths relatively with the widths of the plane and curved areas.

As any angular kinks or sharp bends on a specular reflective surface will present streaks by skipping, doubling-up or otherwise distorting parts of reflected images, it is essential for perception of clear and steady images to have the plane and curved areas smoothly continuous end to end, except at such gaps provided for sound passages.

In Figs. 5 and 6, let numerals 13 and 16 respectively designate a specular reflective surface and picture plane in each picture presenting system. A point 17 on the picture plane will be visible to an eye at a point 18 (Fig. 5) or 18' (Fig. 6) through a reflection at a point 19 on a plane area of the reflective surface 13. A straight line 21—20 is drawn in parallel to line 19—18 at a distance U in Fig. 5, and line 21—20' in parallel to line 19—18' at the same distance in Fig. 6. If an eye at the point 20 (Fig. 5) or 20' (Fig. 6) perceives the point 17 by a reflection at the point 21 on a curved area, a plane 22 tangent to the curvature at the point 21 must be at an angle with the plane of all plane areas. This angle will be called the deviation angle for the reflecting point 21, as the curvature at this point angularly deviates this much from the plane of the reflector. Generically defining a deviation angle, the acute angle which a plane tangent to a curved surface makes with the plane of the reflector is called herein the deviation angle of the curved surface at the point of tangential contact.

If the eyes at the points 18 and 20 (Fig. 5) or 18' and 20' (Fig. 6) are of one person, U is equal to the interpupillary distance or about two and a half inches, and the parallel visual lines 18—19 and 20—21 (Fig. 5) or 18'—19 and 20'—21 (Fig. 6) impress or tend to impress the ocular sensory organs of the person as if the point 17 is at a point great distance away, theoretically infinitely great distance away.

If the deviation angle at the point 21 is greater than it is in the above example, the visual lines from the eyes will be divergent. To effect an intersection of visual lines for the present purpose, these should necessarily be convergent, and hence the deviation angle at the point 21 is the maximum deviation angle useful for the present purpose. More precisely, the curvatures of curved areas should not have at any point greater angular deviation than the above critical deviation angle in order to avoid appearance of streaks or double images.

To find the critical maximum deviation angle V, draw a perpendicular line 17—23 in each of Figs. 5 and 6. Let W represent the obliquity angle of viewing or incident angle at the point 19 which is equal to angle 19—17—23, and X, the perpendicular distance between the reflector surface and picture plane equal to 17—23. Then we have $$\text{Length } 23-19 = X \tan W$$

and $$\text{Length } 19-21 = U \sec W$$

And hence denoting angle 23—17—21 by Y, $$\tan Y = \frac{X \tan W \pm U \sec W}{X}$$

and $$Y = \left(\tan W \pm \frac{U}{X} \sec W\right)^{\tan^{-1}}$$

in which the plus signs are to be used in the cases of Fig. 5 and the minus signs in the cases of Fig. 6.

Since the reflecting direction varies angularly twice as much as the angular change of a reflecting surface, and angle 19—17—21 is indicative of the difference of reflecting directions due to the angular difference of the reflecting surfaces at the points 21 and 19, it follows that $$V = \frac{1}{2}(Y \sim W) = \frac{1}{2}\left(\tan W \pm \frac{U}{X} \sec W\right)^{\tan^{-1}} \sim \frac{1}{2}W$$

Thus, the critical deviation angle V which limits deviation angles of curved surfaces useful for the present purpose is a mathematical function of obliquity angle W of viewing and separation distance X between the reflector and picture carrier in a picture presenting system. That is to mean that in designing a reflector the desired maximum angle of oblique viewing and required separation between a reflector and picture carrier should be reckoned with.

For examples, the desired maximum obliquity angle W of viewing being taken as 37½ degrees which is much more than required in the majority of cases, the critical deviation angles V for separation distances one, four, ten and twenty feet between a reflector and picture will be respectively as follows:

Cases of Fig. 5: 4° 10'; 1° 9'; 28' and 14'
Cases of Fig. 6: 5° 22'; 1° 13'; 29' and 14'

For frontal viewing, the formula for V is simplified to $$\frac{1}{2}\left(\frac{U}{X}\right)^{\tan^{-1}}$$

and corresponding values of the critical deviation angles will be 5° 53'; 1° 30'; 36' and 18'.

From these figures, it will be seen that the difference of the maximum deviation angles desired for obliquity angles zero and 37½ degrees is less than 25 percent above ten feet of separation, and even at one foot it is less than 40 percent. So, the lowest figure, viz. the figure at required maximum obliquity angle may be used in each case without seriously impairing the effectiveness of the reflector.

One of my purposes for presenting the preceding figures is to show that only slight indentations on a specular reflective surface are required for the present purpose, particularly when a reflector is designed for use with a large picture carrier and hence for a large separation between the reflector and picture carrier, as required in a large show place. Such inconspicuous indentations on a reflective surface are desirable in order to minimize local distortions of images to a point of near imperceptibility.

In Fig. 7, numerals 13 and 16 respectively, designate a specular surface and picture plane, for which Fig. 8 is a vertical reference.

Rays from a point 17' on the picture carrier are perceived by the right eye 24 of a spectator through a reflection at a point 25 on a plane area of the reflector and by the left eye 26 through a reflection at a point 27. The extensions of visual lines 24—25 and 26—27 meet at a point 28, symmetrical to the point 17' with respect to the reflective surface 13. Rays from the point 17' incident upon some point 29 on a curved area 12 which has a deviation angle just appropriate for the reflection will be reflected toward the right eye 24. The visual line 24—29 being extended will intersect with an extension of the visual line 26—27—28 at a point (not shown) far behind the point 28. Meanwhile, other rays from the point 17' may be reflected at a point 30 on another curved area toward the left eye 26. The visual line 26—30 will meet the visual line 24—28 at a point 31 behind the point 28. As it will be readily seen, the remoteness of such intersections is dependent upon the distance between two reflection points 27 and 29 or 25 and 30, and when it is equal to $U \sec W$, the remoteness is infinitely great. Figs. 5 and 6 graphically show such instances.

Applying to each point of the picture plane individually for given positions of eyes, it will be found that similar plural intersections of visual lines some at far remote points may take place for the most points of the picture plane, if the widths of the plane and curved areas on the reflector are suitably chosen. Such plural intersections of visual lines for greater part of the picture plane, that is higher percentages of probability of such intersections for the picture plane as a whole, give rise to more effective performance of the device. For this reason, essentially of choosing suitable widths of the plane and curved areas can not be over-emphasized in preparing a reflective surface.

If the widths of plane strip areas are greater than $U \sec W$, there will be some parts of a picture for which necessary plural intersections of visual lines for given positions of eyes may be lacking, and with greater discrepancy therebetween less effective the reflector will be. On the other hand, if the pitch of stripes of plane and curved areas is smaller than $\frac{1}{2}U \sec W$, there will be more than two curved areas within the range of the interpupillary distance, adding extra intersections of visual lines for each small part of a picture, except when the separation distance between the reflector and picture is small. The concurrent effect of such extra intersections of visual lines will be a cause of hazy or blurring effect in images, as the number thereof increases. Hence, the presence of too many curved areas within the range of the interpupillary distance is not conducive to transmission of clear images of pictures, but the presence of one or two extra curved areas which may cause extra intersections of visual lines seems to be tolerable.

A pitch of stripes is defined as the distance between two adjacent corresponding parts of the stripes measured in the direction right angle to the stripes.

Thus the prominence of depth manifestation and clarity of images largely depend upon the widths of the plane and curved areas and the maximum deviation angles of curvatures of the curved areas, all of which are limited within comparatively narrow scopes.

While the maximum deviation angle useful for the purpose can be quite definitely determined by accepting the figure calculated for the maximum obliquity angle of viewing as described, the most effective pitch of stripes of plane and curved areas is not only variable with obliquity angle of viewing in proportion to $\sec W$, but also it differs with different contour of curved surfaces. Generically, the best pitch value may be found mostly around two and a half inches but never above five inches which are respectively about once and twice the interpupillary distance.

Having thus gained the ideas for determining the maximum deviation angle and widths of plane and curved areas, it is a simple matter to estimate the depths of depressions on the reflective surface. The curvature of a curved area may be circular, elliptic or otherwise. Assuming it to be circular, the angle between a plane surface and the cord of the curvature to which the former is tangentially joined will be found to be one half of the maximum deviation angle of the curvature. Hence, the cord angularly deviates from the plane surface by $\frac{1}{2}V$. The frontal width of a curved area being denoted by Z, the depth of a depression will be $$\frac{Z}{2} \tan \frac{V}{2}$$

1.5 inches being given as the value of Z and 4° 10′, 1° 09′, 28′ and 14′ as the values of V, the depths of the depressions will be respectively .027″, .0075″, .003″ and .0015″.

The reflective surface of my reflector is fundamentally flat, but may be slightly concave or convex in one or all directions, when desired, for modifying relative dimensions of reflected images in horizontal and vertical directions or for enlarging or shrinking reflected images, or for any other purpose.

In Fig. 8, a motion picture projection system in a simplified form is illustrated. It comprises a picture screen 16′ of translucent or light pervious material, such as a heavily ground sheet of cellulose of acetate or heavy silk sheet or the like. A picture projector 33 is disposed at a suitable distance from the screen for projecting pictures thereon. Facing the screen, a specular reflector 13′, embodying this invention, is located at a suitable angle with the screen and at a predetermined distance therefrom to reflect rays carrying images of pictures on the screen toward spectators seated at positions 34, 35 and etc. By virtue of reflection on the reflector, the images of pictures will be perceived by each spectator behind and/or on, and sometimes in front of, the normal image plane 32′ which is at the position symmetrical to the picture plane with respect to the reflective surface. It is so, because all main intersections of visual lines, as at point 28 in Fig. 7, due to reflections at points on plane strip areas occur on the normal image plane and practically all auxiliary intersections of visual lines take place on planes behind it with a little probability of intersections in front thereof. However, the above statement does not necessarily imply that some part of the pictures will invariably appear on the normal image plane 32′, as even part of a front object may or may not appear on the normal image plane.

To provoke a reaction of ocular sensory organs for perception of depth in a picture and of relative positions of parts therein, the intersections of visual lines even on two planes at different distances from viewing eyes may be sufficient under certain viewing conditions, rendering each small part of the picture so as to appear at an appropriate position on an intermediate plane.

As depicted in Fig. 8a, the picture screen 16″ may be a usual opaque screen when desired, disposing a picture projector 33 on the front side thereof, the reflector 13′ and screen being sufficiently separated, though in this arrangement picture films should be wound with the picture surface inside in a customary projector to have the right side of pictures on the right.

In Fig. 9, a device for displaying or presenting photographs or prints thereof is shown. A specular reflector 13″ reflects the image of a picture on a picture carrier 16′″ which may be either translucent or opaque depending upon how the picture is to be illuminated. Providing an appropriate means for illumination, the picture is perceived by persons in front of the reflector, as indicated by conventional broken lines.

I have herein advanced the formulae for determining the maximum deviation angle useful for the present purpose for each given separation distance between a reflector and picture carrier, setting the upper limit of deviation angles of curvatures. To obtain depth effect in full prominence, the curvatures of curved areas should have at some points thereon such useful maximum deviation angles or at least deviation angles close to the critical angle calculated for a given separation distance between a reflector and picture carrier and for the required maximum obliquity angle, or inversely, the separation distance should be so adjusted as to make the maximum deviation angles of the curvatures equal to or slightly smaller than the calculated critical angle for the required maximum obliquity angle. However, I may use curvatures with smaller maximum deviation angles than these principally to insure clarity of images, minimizing distortive possibility of curvatures with large deviation angles, particularly when the calculated maximum deviation angle may not be advantageously adopted.

The pitch of stripes of plane and curved areas may also be smaller for smaller pictures with smaller maximum deviation angles of the curvatures. This is permissible, as for small pictures such intersections of visual lines on planes far away from the normal image plane as required for large pictures are not essential.

From the foregoing description taken in connection with the accompanying drawing, the construction and arrangement of parts and method of operation will be readily apparent to those skilled in the art to which this invention appertains.

However, in concluding this description it may not be superfluous to restate the essential points of this invention in order to more clearly distinguish it from trick mirrors or light condensive or dispersive reflectors which may have certain depressions on their reflective surfaces.

To present clear undistorted images of pictures, dominantly perceptible intersections of visual lines must take place and hence adequate plane reflective surfaces on a single plane are indispensable. For the present purpose, less impressive auxiliary intersections of visual lines than those above mentioned must also take place, thereby avoiding appearance of double images. Since light reflecting from curved specular surfaces spreads out either immediately or after converging over a range of directions, the curved surfaces on a reflector are capable of providing auxiliary visual lines within the range and their intersections with other visual lines are less impressive. Therefore, none of reflectors lacking adequate combination of plane and curved reflective areas are operative as an instrument for the present purpose.

For constructing a reflector capable of creating the best or even tolerably good three dimensional effect, the maximum deviation angles of curvatures of curved areas should have certain determinate value within a comparatively narrow scope and the widths of plane and curved strip areas on the specular surface should be of dimensions limited in relation to the interpupillary distance, as herein set forth. Otherwise, the results will be insufficient manifestation of depth in a picture or distorted or blurred images thereof, and a half way operative reflector has no practical value.

While I have herein set forth what I now consider to be the best embodiments of my invention, I may as matters of privilege make modifications, when desired, as to fall within the scope of the invention as claimed.

Having thus described my invention, what I claim as new is:

1. A specular reflector, having a reflective surface which comprises stripes of curved specular areas interposed by substantially plane specular areas smoothly continuing without angular kinks, the widths of said areas being so chosen that not more than four of said curved areas can be fully embraced within the range of the mean interpupillary distance, the width of each of said plane areas dimensionally not exceeding the mean interpupillary distance.

2. A specular reflector, having a reflective surface which comprises stripes of laterally curved areas consisting of convex and concave parts and substantially plane areas interposed between said curved areas, the widths of said areas being so chosen that more than four of said curved areas can not be embraced within the range of the mean interpupillary distance, the individual width of each area dimensionally not exceeding the mean interpupillary distance.

3. A specular reflector, having a reflective surface which comprises alternate stripes of curved specular areas and specular strip areas in parallel to the body of the reflector, the widths of said areas being so chosen that not more than four of said curved areas can be embraced within the range of the mean interpupillary distance, the individual width of each of said areas dimensionally not exceeding the mean interpupillary distance.

4. A specular reflector, having a practically nondispersive reflective surface which comprises a plurality of shallow strip depressions with curved slopes providing specular stripes of ridges and depressions, the combined width of each adjoining pair of a ridge and depression being not more than five inches and not less than one inch to adapt said surface for the purpose herein specified.

5. A specular reflector, having a reflective surface which consists of stripes of plane and curved specular areas, the pitches of said stripes having dimensions within the limit between one and five inches and the maximum deviation angle of each curved area being sufficiently small to have said reflective surface practically nondispersive of light.

6. In a picture presenting device, a picture carrier, and a specular reflector disposed at an angle with and a distance from said carrier and provided with a reflective surface which comprises specular curved areas interposed by substantially plane areas, the widths of said areas being so chosen that not more than four of said curved areas can be embraced within two and a half inches, the individual width of each area having a dimension not exceeding two and a half inches.

7. In a picture presenting system, a picture carrier, and a practically nondispersive specular reflector disposed at a distance therefrom and provided with a reflective surface which comprises stripes of plane and curved specular areas, the widths thereof being sufficiently large and the deviation angles of the curvatures of said curved areas varying below an angle equal to one-half of an angle the tangent of which is equal to 2.5 inches divided by said distance in inches, and thereby being adapted to reflect collectively images, carried by unfocused rays, of pictures on said carrier.

8. In a picture presenting system, a picture carrier, and a specular reflector disposed at a distance therefrom and provided with a reflective surface which comprises a plurality of depressed strip areas with curved slopes providing specular stripes of ridges and depressions of sufficiently large widths to be practically nondispersive, the maximum deviation angles of each curvature of said slopes being smaller than the angular value equal to $$\frac{1}{2}\left(\frac{U}{X}\right)^{\tan^{-1}}$$

in which U represents the average interpupillary distance roughly equal to two and a half inches and X, said distance between the carrier and reflector.

9. In a picture presenting device, a picture carrier, and a specular reflector disposed at an angle therewith and at a predetermined mean distance therefrom and provided with a reflective surface which comprises alternate stripes of plane and curved specular areas adapted to reflect collectively images, carried by unfocused rays, of pictures on said carrier, the maximum deviation angle of each curved area not exceeding an angular value equal to one-half of an angle the tangent of which is equal to the average interpupillary distance divided by said distance between the carrier and reflector.

NAWOKICH TANAKA.